United States Patent [19]

Hess et al.

[11] 3,768,537

[45] Oct. 30, 1973

[54] TIRE

[75] Inventors: Roland H. Hess, Wadsworth; Howard H. Hoekje; Jack R. Creasey, both of Akron; Franklin Strain, Barberton, all of Ohio

[73] Assignee: PPG Industries, Inc., Pittsburgh, Ohio

[22] Filed: Nov. 9, 1972

[21] Appl. No.: 305,046

Related U.S. Application Data

[63] Continuation of Ser. No. 136,541, April 22, 1971, abandoned, which is a continuation-in-part of Ser. No. 806,277, March 11, 1969, abandoned.

[52] U.S. Cl......... 152/330, 106/308 Q, 260/41.5 A, 260/448.8 R, 260/765, 260/766
[51] Int. Cl...................... B60c 11/00, C08c 11/10
[58] Field of Search................ 260/41.5 A, 448.8 R, 260/765, 766; 106/308 Q; 152/330

[56] References Cited
UNITED STATES PATENTS

| | | | |
|---|---|---|---|
| 3,350,345 | 10/1967 | Vanderbilt et al. | 260/41.5 A |
| 3,364,059 | 1/1968 | Marzocchi | 117/72 |
| 3,314,982 | 4/1967 | Koerner et al. | 260/448.8 R |

OTHER PUBLICATIONS

Rubber World – Matls. & Compounding Ingredients for Rubber, (1968), page 277. TS 1890 I 53.

Encyclopedia of Chem. Techn. (2nd Ed.), Vol. 4 (Interscience), (N.Y.), (1964), pages 276–277. TP 9E 58.

Encyclopedia of Pol. Science & Techn., Vol. 1, pages 8–10, 18–22, & 37–41 (Interscience, (N.Y.) (1964). TP 156-P6-E5.

Wolf–Carbon Black–Silica Mixtures in Tire Treads – Rubber World, (N.Y.) 132, 64–70 (1955). TS 1870 I 44.

*Primary Examiner*—Morris Liebman
*Assistant Examiner*—H. H. Fletcher
*Attorney*—Donald M. MacKay

[57] ABSTRACT

The novel tire is comprised of a silica-filled rubber compound which includes a coupling agent such as mercaptopropyl trimethoxysilane. The coupling agent is a compound that forms a bond or connection between rubber and silica. The coupling agent is preferably allowed to interact with the silica prior to incorporating the polar compounds, such as metallic oxide accelerators, into the rubber compound.

12 Claims, No Drawings

TIRE

This is a continuation of application Ser. No. 136,541, filed Apr. 22, 1971, and now abandoned, which is a continuation-in-part of U.S. Ser. No. 806,277 filed Mar. 11, 1969, now abandoned.

This invention relates to rubber compounds suitable for use in tires such as treads and base stocks and, more specifically, this invention relates to silica-reinforced rubber tires.

Previously-known silica reinforced rubber tires provided certain highly-desirable characteristics; for example, silica-reinforced rubber tires are known to have good resistance to tearing, cutting, flex cracking, aging, and skidding. In addition, silica imparts a light color to the tires. Thus, white or colored tires may be made from silica-reinforced vulcanizates.

The present invention provides a silica-reinforced rubber tire which retains the basic advantages previously recognized by the art and further possesses a very significant increase in wear resistance as compared with previous silica-reinforced rubber tires. In addition, the present invention provides substantial improvement in other characteristics over previous silica-reinforced rubber compounds; for example, improved cure time, viscosity, modulus values, tensile strength, compression set, and particularly hysteresis or heat build-up, and tear strength.

The rubber compound used in making the tire of the present invention includes a reinforcing siliceous pigment, a coupling agent, and a rubber polymer. Furthermore, the rubber compound may contain any of the various additives conventionally included in rubber compounds for making tires, as desired, such as accelerators (e.g., guanidines), activators (e.g., zinc oxide), oil extenders (e.g., a mixture of 76 percent aromatic hydrocarbons and 26 percent naphthenic hydrocarbons manufactured and sold by Sun Oil Company under the trademark Sundex 53), curatives (e.g., sulfur), etc.

The present invention principally contemplates tire treads and base stocks for pneumatic tires; however, the broader aspects also include other types of tires. The present invention principally contemplates the type of rubber polymer typically used in tires; for example, styrene butadiene rubber, butadiene rubber, and natural rubber. However, the broader aspects of the present invention would also be applicable to other types of rubber used in tires.

The siliceous pigments preferably employed in this invention are those obtained by the precipitation of a soluble silicate; for example, silica, produced according to the method described in U. S. Pat. No. 2,940,830. These pigments have an $SiO_2$ content of at least 50 percent and usually greater than 80 percent by weight on an anhydrous basis. The siliceous pigment should have an ultimate particle size in a range of 50 to 10,000 angstroms, preferably between 50 and 400 and, more preferably, between 100 and 300 angstroms. The BET surface area of the pigment as measured using nitrogen gas is preferably in the range of 50 to 600, usually 70 to 300 square meters per gram. The BET method of measuring surface area is described in the Journal of the American Chemical Society, Vol. 60, page 304 (1930). A typical commercial form of such reinforcing siliceous pigment is manufactured and sold by PPG Industries, Incorporated, under the trademark Hi-Sil 233.

According to the present invention, it has been found that excellent compounds for use as tire treads and base stocks can be prepared by the addition of a coupling agent to the rubber composition (alternatively referred to herein as rubber compound).

A coupling agent is a material that forms a connection or bond between, in this case, silica and rubber. The present invention is principally directed to the use of a mercapto-silane such as mercaptopropyl trimethoxysilane as the coupling agent; however, the broader aspects would include other coupling agents. Mercaptopropyl trimethoxysilane is a known coupling agent. For example, U. S. Pat. No. 3,350,345 states that gamma-mercaptopropyl trimethoxysilane and other silanes can be employed as coupling agents for use in making hose, rubber belting and tires to obtain a strong bond between the filler or reinforcing agents and the rubber. However, it has not previously been recognized that the mercaptopropyl trimethoxysilane and other silanes claimed herein have a very substantial effect on road wear, heat build-up and tear resistance.

A coupling agent used in the tire tread of the present invention is a di-functional compound which may be represented by general formulae of the type A—R—B, $(A-R-B)_2$, and $(B-R-A)_2$. A represents a functional group that is capable of chemically or physically bonding to a silica particle, such bond, for example, being between a silicon atom of the coupling agent and an oxygen atom of the silica particle. B represents a functional group that is capable of chemically or physically bonding to the rubber polymer, such bond, for example, being between a sulfur atom and the rubber polymer. R represents a bi-functional group that is capable of connecting and bonding A to B.

The preferred group A is a silane group or any group that will provide a silicon atom that bonds with the silica particle. The coupling agent A—R—B may include a group A as follows:

(1)
$$B-R-Si\begin{subarray}{l}X_n\\M_{(3-n)}\end{subarray}$$

The letter designations will have the same meaning whenever used herein. X is any moiety that will react with the silanols present in the silica, thereby permitting the silicon atom of the coupling agent to bond to an oxygen atom of the silica. X can be, for example, a halide. The halide would be released as the hydrogen halide. Alternatively, X can be an oxy-group OR'. R' and M are H, alkyl, cycloalkyl, aryl, aralkyl, alkaryl, or acyl group or a member of these groups bearing substituents such as one of the halides. R' and M are preferably hydrocarbon groups containing between one and 10 carbon atoms and $n$ is 1, 2, or 3. The functional group A is preferably trimethoxysilane $-Si(OCH_3)_3$ or triethoxysilane $-Si(OCH_2CH_3)_3$.

Furthermore, the functional group A could be as follows:

(2)
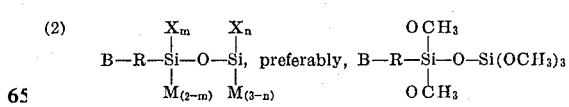

wherein $m$ is 1 or 2

(3) 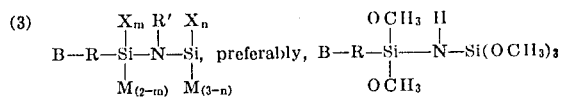

(4) 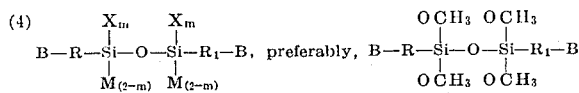

wherein $R_1$, as used herein, is any one of groups described hereinafter under group R (5) 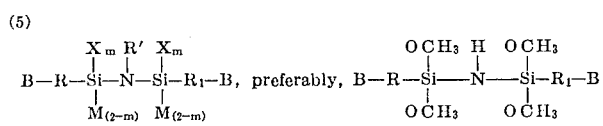

In the broader aspects of the present invention, group A would include other functional groups capable of forming a stable bond with a silica particle.

The preferred group B is a mercapto group —SH. However, group B would also include other groups capable of providing a sulfur that will bond with the rubber polymer. For example, the following groups would provide such an available sulfur atom:

1. A — R — S — S — R'

(2) 

(3) 

(4) 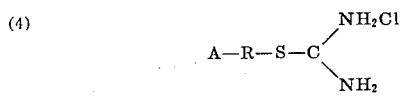

5. A — R — S — Z wherein Z is chloride or bromide
6. A — R — S — S — $R_1$ — A (7) 

8. A — R — S — (S)$_x$ — S — $R_1$ — A wherein $x$ equals 0 to 6

(9) 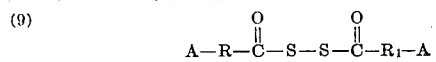

(10) 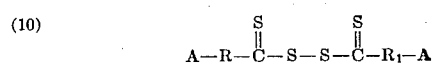

(11) 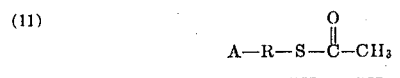

(12) 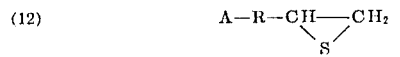

In the broader aspects of the present invention group B would include other functional groups capable of forming a stable bond with the rubber polymer.

The group R in the formula A — R — B is a connecting group and as such can be any group capable of connecting A with B in a stable manner. In some instances R may be a chemical bond directly between A and B but generally R will be a hydrocarbon chain or ring group. R is preferably a hydrocarbon having from one to 10 carbon atoms and, more preferably, an alkyl hydrocarbon having from one to four carbon atoms. The hydrocarbon chain, however, could be longer and could be branched. Group R further could be a saturated cycloalkyl of any size such as:

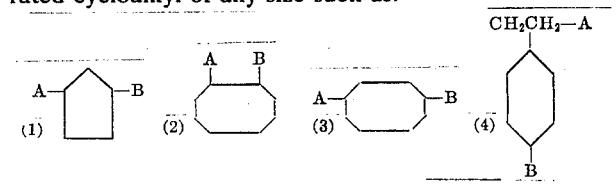

preferably,

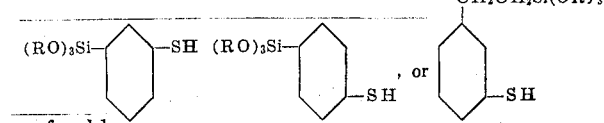

The saturated cycloalkyl could bear substituents such as methyl, ethyl, or propyl groups. Also the functional groups A and B could either be joined directly to the cycloalkyl or to the substituent. Group R also could be a bicycloalkyl such as:

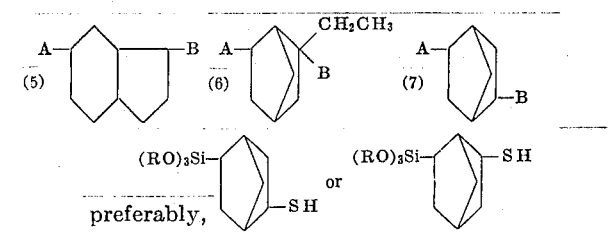

or preferably,

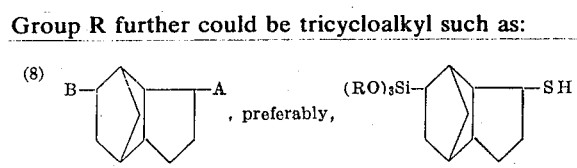

Group R further could be tricycloalkyl such as:

(8) 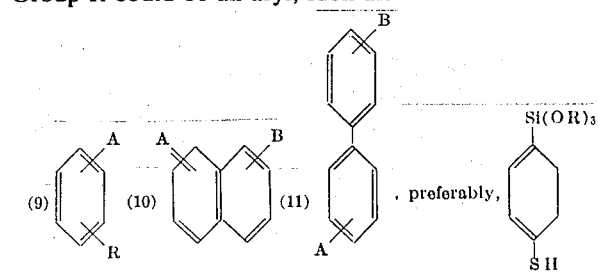, preferably,

Group R could be an aryl, such as:

, preferably,

Group R could be an unsaturated alkyl, such as:

12. A — $CH_2$ — $CH_2$ — CH = CH — B

Group R could be an aralkyl such as:

(13)

wherein $y$ is any number between 1 and 4. Furthermore, R could be any combination of organic moieties linked together such as an ether, an ester, or an amide, typically 14. H — S — CH$_2$ — CH$_2$ — O — CH$_2$ — CH$_2$ — CH$_2$ — Si(OCH$_3$)$_3$

(15)
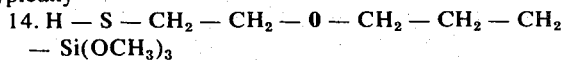

(16)
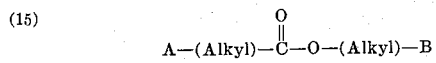

Preferred examples of the coupling agent A — R — B are mercaptopropyl trimethoxysilane, mercaptopropyl triethoxysilane, a mixture of

(CH$_3$O)$_3$ — SiCH$_2$CH$_2$CH$_2$ — S — S — CH$_2$CH$_2$CH$_2$Si(OCH$_3$)$_3$, a mixture of

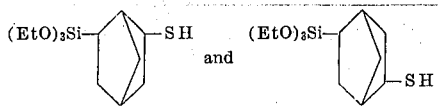

a mixture of

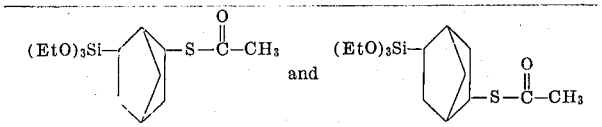

a mixture of (CH$_3$O)$_3$SiCH$_2$CH$_2$CH—CH$_3$
              |
              SH and

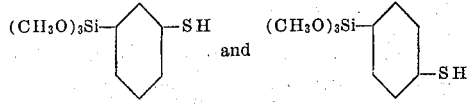

(CH$_3$O)$_3$SiCH$_2$CHCH$_2$CH$_3$,
            |
            SH having —Si(OEt)$_3$ and H added to one of the double bonds and —SH and H added to the other double bond, and

having —Si(OEt)$_3$ and H added to one of the double bonds and —SH and H added to the other double bond. The preferred examples of the coupling agent would further include

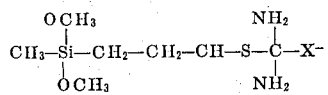

where X is a halogen.

Unless otherwise indicated, the hereinafter described ingredients will be stated as parts by weight. Furthermore, the formulations will be based on one hundred parts of rubber. Typically, the rubber composition used in the tires of the present invention may include 100 parts of rubber such as a styrene-butadiene rubber; 5 to 100 parts of silica (preferably 40 to 90 parts) such as Hi-Sil 233 (Trademark of PPG Industries, Inc.) reinforcing siliceous pigment; 0.1 to 15 parts coupling agent (preferably 1 to 3 parts) such as mercaptopropyl trimethoxysilane; and conventional sulfur or peroxide curatives. The sulfur curative may include 0.5 to 3 parts sulfur, 2 to 5 parts zinc oxide, and 0.5 to 2 parts accelerator. A peroxide curative may include 1 to 4 parts dicumyl peroxide, such as Dicup 40C (Trademark of Hercules Powder Company, Inc.). Although not essential, other conventional rubber additives are not detrimental. Other conventional rubber additives would include carbon blacks, oils, plasticizers, antioxidants, and colors.

The coupling agent can be added in any of several stages of rubber compounding. For example, satisfactory rubber compositions have been obtained when the di-functional organic compound, preferably mercaptoalkyl trimethoxysilane, is reacted with the silica prior to incorporating the silica into the rubber batch such as by coating the silica with the coupling agent. Satisfactory rubber compositions have also been obtained when the coupling agent is incorporated into a co-precipitated silica latex masterbatch. The coupling agent can be reacted with the rubber prior to incorporation of the silica therein or it can be added to the rubber batch together with silica and various other additives during the Banbury mixing. The coupling agent may be in any one of several forms when it is reacted with the rubber or silica; for example, it may be in the vapor state. Alternatively, it could be added in a substantially pure state, dissolved in an organic solvent, or dissolved or suspended in water.

Preferably, the coupling agent is permitted to react with the silica and the rubber prior to the incorporation of any of the polar additives, particularly soaps, metal oxides (especially zinc oxide), amines, glycols, and accelerators (especially guanidine) into the rubber batch. The following examples are illustrative of the present invention.

EXAMPLE I

Rubber Compounds I-A through I-D were prepared according to the following formulations. Rubber Compound I-A is one preferred example of the present invention. The ingredients shown in Table I were mixed in a Banbury for about 5 minutes at a temperature of between 300° and 320°F.

TABLE I

| Rubber Compounds Ingredients (parts by weight) | I-A | I-B | I-C | I-D |
|---|---|---|---|---|
| SBR 1712 (cold oil masterbatch butadiene-styrene rubber | 66 | 66 | 68.75 | 65.75 |
| High Cis content polybutadiene rubber | 50 | 50 | 50 | 50 |
| N-285 Black[1] | | | 70 | 70 |
| Hi-Sil 233[2] | 70 | 70 | | |
| S-300[1] Black[3] | 1.0 | 1.0 | | |
| Mercaptopropyl trimethoxysilane | 1.5 | | 1.5 | |
| Carbowax 4000 (Solid | | | | |

| | | |
|---|---|---|
| Glycol) | 1.5 | |
| Sundex 790[4] (Aromatic Oil) | 26 26 26 26 | |
| Zinc oxide | 4 4 | |
| Stearic acid | 2 2 2 2 | |
| Phenyl-beta-naphthylamine | 1 1 1 1 | |
| Flexamine G[5] | 1 1 1 1 | |

[1] Standard ASTM designation.
[2] Trademark, PPG Industries, Inc. A precipitated, hydrated silica having an ultimate particle size of 200 angstroms, a BET surface area of approximately 150 square meters per gram, and containing $SiO_2$ — 87.5%, CaO — 0.75%, $R_2O_3$ — 0.95%, NaCl — 1.6%, a weight loss at 105°C. of 6.3% and the balance is bound water.
[3] The carbon black was added to the silica-filled rubber for purposes of coloring the rubber.
[4] Trademark, Sun Oil Company.
[5] Trademark, United States Rubber Company. A physical mixture containing 65% of a complex diarylamine ketone reaction product and 35% of a commercial N, N'-diphenyl-p-phenylene diamine.

The rubber batch was further mixed on an open mill and the ingredients shown in Table II were added. The mixing on the mill was continued for about 10 min. at 180°F.

TABLE II

| | I-A | I-B | I-C | I-D |
|---|---|---|---|---|
| 2,2' Benzothiazole disulfide | 1.5 | 1.5 | 0.7 | 0.7 |
| Diphenyl guanidine | 1.5 | 1.5 | 0.65 | 0.65 |
| Sulfur | 2.2 | 2.2 | 1.85 | 1.85 |
| Tetramethylthiuram disulfide | 0.2 | 0.2 | | |
| Zinc oxide masterbatch (containing ⅓ butadienestyrene rubber and ⅔ zinc oxide) | | | 6 | 6 |

The resulting compounds had the following characteristics:

TABLE III

| Compound | 90% cure (min.) | 212° F. viscosity[1] ML 4' | Heat build-up[2] | Compression set[3] | Pico abrasion index[4] | Road wear index[5] |
|---|---|---|---|---|---|---|
| I-A | 12.0 | .52 | 85 | 13 | 88 | 167 |
| I-B | 15.5 | 76 | 94 | 20 | 59 | 86 |
| I-C | 19.0 | 55 | 139 | 22 | 106 | 122 |
| I-D | 21.0 | 42 | 142 | 24 | 114 | 123 |

[1] Tested according to ASTM D-1646.
[2] Tested according to ASTM D-623 method A.
[3] Tested according to ASTM D-395 method B.
[4] Tested according to ASTM D-2228-631.
[5] Tested by Three-T Fleet, Inc., substantially as described in Pat. No. 3,397,383. The results are accurate to within 5 points.

In determining the Road Wear Index, a tread band or portion was prepared of each of the Rubber Compounds I-A through I-D. The tread bands were applied to a new tire carcass. The tire cure included preheating the rubber compounds for 35 minutes at 210°F., then placing same in the mold for 17 minutes at 331°F. The tire was mounted on an automobile which was driven at 70 miles per hour on a hard-surfaced road for 4,400 miles. The road traveled was flat and included a combination of curved portions and straight portions. This test is designated as being a combination of slow and fast wear. The amount of tread lost during the test is determined and the Road Wear Index shows a comparison of the wear of each of the tread bands using an arbitrary standard of reference. The tire size was 7.35 by 14 inches. The load was 1,160 pounds on each tire. The tires were inflated to 32 pounds per square inch gauge.

The following table shows further characteristics of Rubber Compounds I-A through I-D.

TABLE IV (Compounds Cured for 30 minutes at 300°F.)

| Compound | Modulus at 300% Elongation[6] (p.s.i.) | Tensile Strength[6] (p.s.i.) | Hardness (Shore A)[7] |
|---|---|---|---|
| I-A | 690 | 3110 | 57 |
| I-B | 310 | 2380 | 62 |
| I-C | 990 | 2580 | 58 |
| I-D | 820 | 2580 | 59 |

[6] Tested according to ASTM D-412
[7] Tested according to ASTM D-314

Tables III and IV show that the Rubber Compound I-A has substantially improved characteristics for tire tread. The improved characteristics include cure time, viscosity, tensile strength, modulus values, compression set, Pico Abrasion Index, and Road Wear Index. The improved Road Wear Index is of particular importance. Examination of the Road Wear Index values shows that the Rubber Compound I-A, which is one preferred embodiment of the present invention, has a resistance to road wear nearly 50 per cent greater than the Road Wear Index of Compound I-B which is a silica-reinforced rubber compound without the coupling agent. Rubber Compound I-A has a resistance at least equal to and possibly superior to the best carbon black reinforced rubber compound such as Rubber Compound I-D. The coupling agent was found to have no apparent effect on the wear resistance of carbon black reinforced tire treads.

Rubber Compounds I-E through I-H were prepared according to the following formulations. The following ingredients were mixed in a Banbury for 5 minutes at between 300° and 320°F.

TABLE V

| Compounds | I-E | I-F | I-G | I-H |
|---|---|---|---|---|
| SBR 1502 (cold butadienestyrene rubber) | 98 | 98 | 100 | 100 |
| N-285 Black* | | | 60 | 60 |
| Hi-Sil 233 silica | 60 | 60 | | |
| S-300* Black** | 1.0 | 1.0 | | |
| Mercaptopropyl trimethoxysilane | 1.5 | | 1.5 | |
| Carbowax 4000 (Solid Glycol) | | 1.5 | | |
| Sundex 790 (Aromatic Oil) | 10 | 10 | 10 | 10 |
| Zinc oxide | | | 4 | 4 |
| Stearic acid | | | 2 | 2 |
| Phenyl-beta-naphthylamine | 1 | 1 | 1 | 1 |
| Flexamine G | 1 | 1 | 1 | 1 |

* See Table I, note 1
** See Table I, note 3

The following ingredients were added during mixing on the open mill. The mixing on the mill was continued for about 10 minutes at 180°F.

| Compound | I-E | I-F | I-G | I-H |
|---|---|---|---|---|
| 2,2'Benzothiazole disulfide | 1.5 | 1.5 | 0.8 | 0.8 |
| Di-ortho-tolylguanidine | 1.5 | 1.5 | 0.3 | 0.3 |
| Sulfur | 2.75 | 2.75 | 1.85 | 1.85 |
| ZnO Masterbatch (⅓ butadiene-styrene rubber and ⅔ zinc oxide) | | | 6 | 6 |

The Rubber Compounds I-E through I-H when tested according to the afore-described standard procedures and had the following characteristics:

TABLE VI

| Compound | 90% cure (min.) | Viscosity ML 4 212° F. | Heat build-up | Compression set | Pico abrasion index | Road wear index |
|---|---|---|---|---|---|---|
| I-E | 20 | 77 | 49 | 12 | 131 | 114 |
| I-F | 36.5 | 100 | 85 | 25 | 81 | 79 |
| I-G | 38.0 | 71 | 72 | 18 | 163 | 115 |
| I-H | 37.5 | 76 | 73 | 20 | 170 | 110 |

The Rubber Compounds I-E through I-H, cured for 30 minutes at 300°F., had the following characteristics:

| Compound | Tensile Strength | 300% Modulus | % Elongation | Hardness (Shore A) |
|---|---|---|---|---|
| I-E | 4190 | 1940 | 510 | 68 |
| I-F | 3040 | 590 | 670 | 69 |
| I-G | 3310 | 2100 | 460 | 72 |
| I-H | 3480 | 2080 | 500 | 72 |

EXAMPLE II

The following example illustrates the effect of the order in which certain of the ingredients were added. In each of the Rubber Compounds II-A through II-D, the following formulation was used:

TABLE VII

| Ingredients Added in Banbury | Parts |
|---|---|
| SBR-1502 (Cold, non-pigmented butadienestyrene rubber) | 100 |
| Hi-Sil 233 silica | 60 |
| Circosal 596¹ (naphthenic type oil) | 10 |
| Phenyl-beta-naphthylamine | 1 |
| Flexamine | 1 |
| Ingredients Added on the Mill | Parts |
| 2,2'Benzothiazole disulfide | 1.5 |
| Di-ortho-tolylguanidine | 1.5 |
| Sulfur | 2.75 |

¹Trademark, Sun Oil Company

Compound II-A further included 1.5 parts mercaptopropyl trimethoxysilane which was added during Banbury mixing and 4 parts zinc oxide added during mixing on the finishing mill. Rubber Compound II-B included 1.5 parts mercaptopropyl trimethoxysilane and 4 parts zinc oxide, both of which were added during Banbury mixing. Rubber Compounds II-C and II-D did not contain a coupling agent but did include 4 parts zinc oxide. The zinc oxide was added to Rubber Compound II-C during mixing on the mill and Rubber Compound II-D received the zinc oxide during Banbury mixing. The Compound II-A was made according to a preferred method of the present invention. The Compounds II-A through II-D were found to have the following characteristics when tested according to the afore-described standard test methods.

TABLE VIII

| Compound | 90% cure (min.) | Viscosity ML 4' 212° F. | Heat build-up | Compression set | Pico abrasion index | Road wear index |
|---|---|---|---|---|---|---|
| II-A | 22.5 | 61 | 41 | 10 | 105 | 111.3 |
| II-B | 22.5 | 44 | 57 | 13 | 37 | 95.0 |
| II-C | 32.5 | 66 | 77 | 20 | 68 | 79.2 |
| II-D | 37.5 | 68 | 81 | 29 | 68 | 73.9 |

TABLE IX

Compounds Cured for 30 Min. at 300°F.

| Compound | Modulus at 300% Elongation (p.s.i.) | (Tensile Strength (p.s.i.) | Hardness (Shore A) |
|---|---|---|---|
| II-A | 1870 | 3320 | 66 |
| II-B | 1460 | 2810 | 69 |
| II-C | 740 | 2560 | 70 |
| II-D | 570 | 2440 | 72 |

Tables VIII and IX show that the Rubber Compound II-A used in making tire treads of the present invention has a substantial improvement in the characteristics of cure time, viscosity, tensile strength, modulus values, compression set, Pico Abrasion Index, and Road Wear Index.

EXAMPLE III

The following example illustrates the effectiveness of the present invention when the coupling agent (e.g., mercaptopropyl trimethoxysilane) is added to and reacted with the basic rubber material prior to compounding. About 90 grams of a butadiene-styrene rubber was dissolved in about 2,000 milliliters of benzene. The temperature of the solution was adjusted to about 60°C. and dissolved oxygen was removed from the solution. About 2.7 grams of mercaptopropyl trimethoxysilane was added to the solution and reacted with the rubber in the presence of a peroxide catalyst. The reaction product was precipitated from the solution by slowly adding about 4,000 milliliters of methanol during constant stirring. The reaction product was washed and then dried in a vacuum at 40°C. 100 parts of the rubber-coupling agent reaction product containing about 3 per cent by weight mercaptopropyl trimethoxysilane were placed in a Banbury and the following ingredients were added: Hi-Sil 233 (Trademark, PPG Industries, Inc.) silica - 60 parts; zinc oxide - 4 parts; di-ortho-tolylguanidine - 1.5 parts; sulfur - 2.5 parts; stearic acid - 5.0 parts; benzothiazole disulfide - 0.75 parts; and phenyl-beta-naphthylamine - 1.0 parts. For purposes of comparison, a similar Rubber Compound III-B was prepared substantially identical to Rubber Compound III-A except that it contained no mercaptopropyl trimethoxysilane. Both rubber compounds were cured for 60 minutes at 300°F. The Rubber Compounds III-A and III-B were tested according to the afore-described standard procedures and found to have the following properties:

TABLE X

| | Compound III-A | Compound III-B |
|---|---|---|
| 100% modulus p.s.i. | 1530 | 410 |
| Tensile strength p.s.i. | 2980 | 3200 |
| Elongation at break % | 170 | 515 |
| Hardness (Shore A) | 86 | 85 |
| Pico Abrasion Index | 128 | 66 |

EXAMPLE IV

The following illustrates the embodiment of the present invention in which the coupling agent or difunctional compound is reacted with the silica prior to incorporating the silica in the rubber batch. Sixty parts of Hi-Sil 233 silica were dried at 105°C. A slurry was prepared by adding 600 parts toluene to the dry silica. Mercaptopropyl trimethoxysilane in an amount of 1.8 parts was added to the slurry and the slurry was stirred for 2 hours. The toluene was then removed. A Rubber Compound IV-A was prepared by mixing 100 parts SBR 1503; 60 parts silica (containing 3 per cent mercaptopropyl trimethoxysilane); 4 parts zinc oxide; 0.7 parts benzothiazole disulfide; 1.5 parts di-ortho-tolylguanidine; 2.5 parts sulfur; 1.0 part phenyl-beta-naphthalylamine. For purposes of comparison, a similar Rubber Compound IV-B was prepared, however, using silica which did not include mercaptopropyl trimethoxysilane. The Rubber Compounds IV-A and IV-B were tested according to the afore-described standard procedures and were found to have the following characteristics:

TABLE XI

| | Compound IV-A | Compound IV-B |
|---|---|---|
| 100% modulus p.s.i. | 580 | 320 |
| Tensile Strength p.s.i. | 3400 | 2640 |
| Elongation at Break % | 260 | 600 |
| Hardness (Shore A) | 75 | 85 |

EXAMPLE V

The following illustrates the effect that the amount of coupling agent has on the Road Wear Index of the tire tread.

TABLE XII

| Rubber Compound | V-A | V-B | V-C |
|---|---|---|---|
| Ingredients Added in Banbury: | | | |
| SBR-1502 | 98 | 98 | 98 |
| Hi-Sil 233 silica | 60 | 60 | 60 |
| Mercaptopropyl Trimethoxy-silane | 1.5 | 1.0 | 0.75 |
| Circosol 596 | 10 | 10 | 10 |
| Phenyl-beta-naphthylamine | 1 | 1 | 1 |
| Flexamine G | 1 | 1 | 1 |
| Ingredients Added on the Mill: | | | |
| 2,2'Benzothiazole disulfide | 1.5 | 1.5 | 1.5 |
| Di-ortho-tolylguanidine | 1.5 | 1.5 | 1.5 |
| Sulfur | 2.75 | 2.75 | 2.75 |
| ZnO Masterbatch (⅓ butadiene-styrene rubber and ⅔ zinc oxide) | 6 | 6 | 6 |

The ingredients were mixed substantially as described in Example I. The Road Wear Index of Rubber Compound V-A was 111.3; Rubber Compound V-B was 110.0; and Rubber Compound V-C was 102.8.

The following Examples VI-A, VI-B, and VI-C are illustrated in Table XIII and indicate the usefulness of the compositions of the invention as base stocks in tires. The rubber compounds were prepared in accordance with the general procedure of Example I and the ingredients indicated by the asterisk were added on the mill. Example VI-A is a Control containing no siliceous pigment or silane of the invention. The compounds were tested for tensile strength, modulus, and elongation as above and additionally were subjected to the Goodrich Flexometer Test to measure heat build-up and a Razor Tear Test to measure the compounds' resistance to tear. This latter test comprises employing a 1 inch wide sample of molded rubber cut from a tensile sheet having a thickness of approximately 75 mils which is placed on a jig and a razor cut made from above to a sufficient depth to leave from between 10 and 20 mils uncut depth. The rubber is then pulled apart on the cut at a rate of 50 inches a minute and the pounds per inch thickness required to tear the sample computed. From the data reported in the Table, it can be seen that compounds VI-B and VI-C have considerably higher tear resistance and significantly lower heat build-up than the Control which renders the compounds of the invention particularly suitable for tire base stocks where heat build-up is particularly to be avoided. In addition, the compounds still have the other required tire properties in the approximate same range as the control.

TABLE XIII

| Rubber Compounds Ingredients (parts by weight) | VI-A | VI-B | VI-C |
|---|---|---|---|
| NR (SMR 5L) | 100.0 | | |
| HAF (N 330) black | 50.00 | 35.0 | 15.0 |
| Hi-Sil 233 (8-469) | | 15.0 | 35.0 |
| Zinc oxide | 5.0 | | |
| Stearic acid | 2.0 | | |
| N-(1,3-dimethyl butyl)-N'phenyl-p-phenylene-diamine | 3.0 | | |
| Sundex 790 | 7.0 | | |
| Mercaptopropyl trimethoxy silane | | 0.3 | 0.7 |
| N-cyclohexyl-2-benzothiazole disulfenamide | 1.4 | | |
| Tetramethyl thiuram disulfide | | | 0.1 |
| Sulfur | 2.25 | | |
| Zinc oxide | | 5.0 | 5.0 |
| Total: | 170.65 | 170.95 | 171.45 |
| Mooney Scorch (small roller) ASTM-D-1646 — 275°F. T/10 points | 10.3 | 12.0 | 15.0 |
| Mooney Scorch (large roller) 212°F. | 57 | 66 | 62 |
| Rheometer at 280°F. ASTM-D-2705 | | | |
| $T_{min}$ | 3.8 | 3.9 | 3.3 |
| $T_{max}$ | 69.4 | 65.0 | 62.3 |
| Scorch | 8.0 | 9.5 | 12.0 |
| R 90 | 19.0 | 20.5 | 18.5 |
| R 95 | 21.5 | 22.0 | 20.0 |
| Tensile (p.s.i.) | | | |
| 15 at 280°F. | 4180 | 3850 | 4240 |
| 30 | 3890 | 4070 | 4030 |
| 45 | 3790 | 3960 | 3930 |
| 300% Modulus (p.s.i.) | | | |
| 15 at 280°F. | 2030 | 1810 | 1590 |
| 30 | 2510 | 2130 | 1540 |
| 45 | 2480 | 2070 | 1440 |
| Elongation (p.s.i.) | | | |
| 15 at 280°F. | 540 | 580 | 600 |
| 30 | 430 | 500 | 600 |
| 45 | 430 | 500 | 600 |
| Goodrich Flex | | | |
| Durometer | 67 | 58 | 56 |
| % Set | 5.8 | 5.1 | 4.4 |
| Δ Temp. | 43 | 31 | 28 |
| Razor Tear (0.016–0.020) ASTM-D-623-67 | | | |
| 30' at 280°F. | 79 | 111 | 110 |

Although the present invention has been described with reference to the specific details of particular embodiments thereof, it is not intended thereby to limit the scope of the invention, except insofar as the specific details are recited in the appended claims.

We claim:

1. An abrasion-resistant, heat-resistant tire tread including cap and base stock comprising a vulcanized rubber compound including the reaction product of a rubber polymer of styrene-butadiene, butadiene or natural rubber from 5 to 100 parts by weight of a finely-divided, reinforcing, siliceous pigment having an ultimate particle size in a range of 50 to 1,000 angstroms; a minor effective coupling amount of from 0.1 to 15 parts by weight of a coupling agent having the general formula A — R — B, wherein A represents a functional group capable of bonding to the siliceous pigment, B represents a group capable of providing a sulfur that will bond with the rubber polymer, and R represents a functional group which connects A and B, said amounts based on 100 parts by weight of rubber polymer.

2. The tire tread as defined in claim 1 wherein A provides a bond with the siliceous pigment through a silicon atom.

3. The tire tread as defined in claim 1 wherein B provides a bond with the rubber polymer through a sulfur atom.

4. The tire tread as defined in claim 1 wherein R is a hydrocarbon group having between one and 10 carbon atoms.

5. A tire tread as defined in claim 1 wherein the coupling agent has the general formula selected from the group consisting of

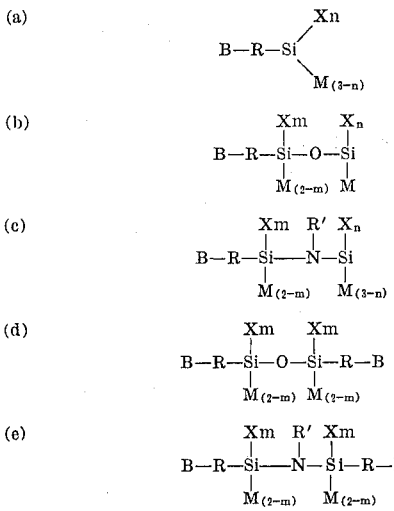

wherein X is a member selected from the group consisting of a halogen and an oxy group having the general formula OR' wherein R' is a member selected from the group consisting of hydrogen, alkyl, cycloalkyl, aryl, aralkyl, alkaryl, acyl groups, and such groups bearing substituents: and M is a member independently selected from the same group as R' and wherein $m$ is 1 or 2 and wherein $n$ is 1, 2, or 3.

6. A tire tread as defined in claim 5 wherein the coupling agent has a general formula selected from the group consisting of:

a. $A - R - S - R'$

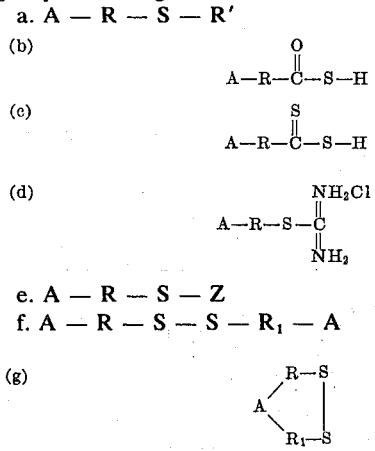

e. $A - R - S - Z$ f. $A - R - S - S - R_1 - A$ (g) 

h. $A - R - S - (S)_x - S - R_1 - A$ (i) 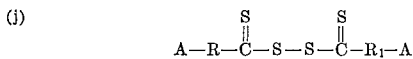

(j) 

(k) 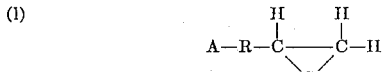

(l)

$$A-R-C\underset{H}{\overset{H}{|}}\underset{\diagdown S \diagup}{\phantom{M}}\overset{H}{\underset{|}{C}}-H$$

m. $A - R - SH$ wherein $R_1$ is an alkylene group and $x$ is a numeral between 0 and 6 and Z is chloride or bromide.

7. The tire tread as defined in claim 1 wherein said coupling agent is a member selected from the group consisting of mercaptopropyl trimethoxysilane and mercaptopropyl triethoxysilane.

8. The tire tread as defined in claim 7 wherein the rubber compound includes by weight 100 parts of styrene-butadiene rubber, from 40 to 90 parts of finely-divided, reinforcing, siliceous pigment, and from 1 to 3 parts coupling agent.

9. The tire tread as defined in claim 8 wherein said rubber compound includes polar ingredients and wherein said coupling agent is reacted with said silica prior to adding said polar ingredients to said rubber compound.

10. A curable rubber tire tread or base stock comprising by weight 100 parts unsaturated rubber polymer of styrene-butadiene, butadiene or natural rubber from 40 to 90 parts finely-divided, reinforcing, siliceous pigment, having an ultimate particle size in the range between 100 and 300 angstroms and a minor effective coupling amount of from 0.1 to 15 parts coupling agent having the general formula $A - R - B$, wherein A represents a functional group capable of bonding to the siliceous pigment, B represents a group capable of providing a sulfur that will bond with the rubber polymer, and R represents a functional group which connects A and B.

11. The tire tread as defined in claim 1 wherein the reinforcing pigment consists essentially of a siliceous pigment.

12. The tire tread as defined in claim 1 wherein carbon black is present in a coloring amount of about 1 part per 100 parts of rubber polymer.

* * * * *

UNITED STATES PATENT OFFICE
CERTIFICATE OF CORRECTION

Patent No. 3,768,537          Dated October 30, 1973

Inventor(s) Roland H. Hess, Howard H. Hoekje, Jack R. Creasey, Franklin Strai

It is certified that error appears in the above-identified patent and that said Letters Patent are hereby corrected as shown below:

Column 1, line 36, cancel "76" and substitute --37--;
Column 1, line 37, cancel "and 26%" and substitute --34% paraffinic hydrocarbons and 29%--
Column 1, line 57, cancel "10,000" and substitute --1,000--.

Column 3, lines 38-40 the formula should read as follows:

(4)
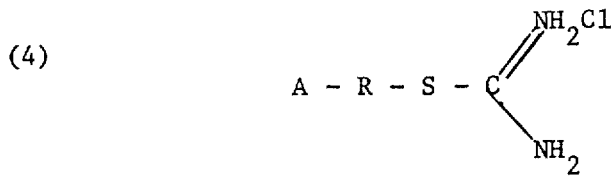

Column 5, lines 63-65 the formula should read as follows:

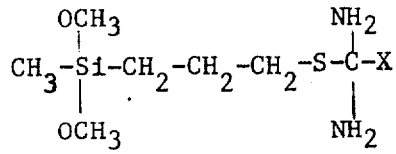

Column 12, lines 17-20 insert an --*-- (asterisk) at the end of the last four ingredients in Table XIII, which should now read:

disulfenamide*
Tetramethyl thiuram disulfide*
Sulfur*
Zinc oxide*

UNITED STATES PATENT OFFICE
CERTIFICATE OF CORRECTION

Patent No. 3,768,537  Dated October 30, 1973

Inventor(s) Roland H. Hess, Howard H. Hoekje, Jack R. Creasey, Franklin Strain

It is certified that error appears in the above-identified patent and that said Letters Patent are hereby corrected as shown below:

Column 13, lines 46-48 the formula should read as follows:

(d)
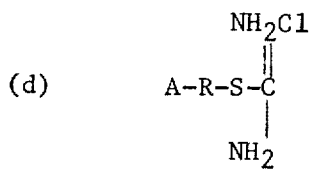

Signed and sealed this 23rd day of April 1974.

(SEAL)
Attest:

EDWARD M. FLETCHER, JR.  C. MARSHALL DANN
Attesting Officer  Commissioner of Patents